(12) United States Patent
Schmitzberger et al.

(10) Patent No.: US 11,280,297 B2
(45) Date of Patent: Mar. 22, 2022

(54) METHOD FOR PRODUCING A METERING VALVE, AND METERING VALVE

(71) Applicant: Robert Bosch GmbH, Stuttgart (DE)

(72) Inventors: Markus Schmitzberger, Wilhering (AT); Helmut Rammerstorfer, Goldwörth (AT); Martin Hainberger, Linz (AT)

(73) Assignee: Robert Bosch GmbH, Stuttgart (DE)

( * ) Notice: Subject to any disclaimer, the term of this patent is extended or adjusted under 35 U.S.C. 154(b) by 159 days.

(21) Appl. No.: 16/635,994

(22) PCT Filed: Jul. 31, 2018

(86) PCT No.: PCT/EP2018/070704
§ 371 (c)(1),
(2) Date: Jan. 31, 2020

(87) PCT Pub. No.: WO2019/025429
PCT Pub. Date: Feb. 7, 2019

(65) Prior Publication Data
US 2020/0173397 A1    Jun. 4, 2020

(30) Foreign Application Priority Data
Aug. 3, 2017  (DE) ...................... 10 2017 213 454.2

(51) Int. Cl.
*F02M 21/02*   (2006.01)
*F02M 61/20*   (2006.01)

(52) U.S. Cl.
CPC .... *F02M 21/0242* (2013.01); *F02M 21/0254* (2013.01); *F02M 21/0272* (2013.01); *F02M 61/205* (2013.01)

(58) Field of Classification Search
CPC ............. F02M 21/0272; F02M 61/168; F02M 61/205; F16K 47/04; F16K 31/0655
See application file for complete search history.

(56) References Cited

U.S. PATENT DOCUMENTS

| 4,273,309 | A | * | 6/1981 | Morrison | ............... F16K 5/0673 |
| | | | | | 251/174 |
| 5,065,725 | A | * | 11/1991 | Spoetter | ............. G05D 16/0661 |
| | | | | | 123/463 |
| 6,131,829 | A | * | 10/2000 | Ricco | ................. F02M 63/0022 |
| | | | | | 239/585.1 |

(Continued)

FOREIGN PATENT DOCUMENTS

| CN | 105275672 | A | * | 1/2016 | |
| DE | 102004045393 | A1 | * | 3/2006 | ............. F02M 61/08 |

(Continued)

OTHER PUBLICATIONS

English machine translation of description of CN-105275672-A provided by ESPACENET (Year: 2022).*

(Continued)

*Primary Examiner* — Michael A Kessler
(74) *Attorney, Agent, or Firm* — Michael Best & Friedrich LLP

(57) ABSTRACT

The invention relates to a method for producing a metering valve (1) for a fluid, in particular for a liquid and/or gaseous fuel, comprising a preferably plate-shaped valve seat element (2) having at least one throughflow opening (3) for the liquid and/or gaseous fuel, a lift-movable valve disk (4) that sealingly interacts with the valve seat element (2) for releasing and closing the at least one throughflow opening (3), and a stroke stop element (5) having an annular stroke stop surface (6) for limiting the stroke of the valve disk (4). According to the invention, the stroke stop element (5) is axially pretensioned in the direction of a stroke adjustment ring (7) surrounding the valve disk (4). In order to finely adjust the stroke of the valve disk (4), the axial pretensioning force is altered, whereby the stroke stop element (5) is deformed. The invention further relates to a metering valve (1) for a fluid.

17 Claims, 2 Drawing Sheets

(56) References Cited

U.S. PATENT DOCUMENTS

| | | | | |
|---|---|---|---|---|
| 6,152,387 | A | * | 11/2000 | Ricco ................ F02M 63/0017 239/585.1 |
| 6,155,534 | A | * | 12/2000 | Steinruck ............ F16K 31/0655 251/129.18 |
| 6,182,943 | B1 | * | 2/2001 | Steinruck ........... F02M 21/0254 251/129.16 |
| 9,382,884 | B2 | * | 7/2016 | Schmieder ............. F02M 61/20 |
| 2006/0202144 | A1 | * | 9/2006 | Ricco ................... F02M 47/027 251/129.16 |
| 2011/0266474 | A1 | * | 11/2011 | Ranegger ........... F02M 21/0254 251/129.01 |

FOREIGN PATENT DOCUMENTS

| | | | | |
|---|---|---|---|---|
| DE | 102014225421 | | 6/2016 | |
| DE | 102014226421 | A1 * | 6/2016 | ......... F02M 21/0263 |
| DE | 102015212475 | | 1/2017 | |
| DE | 102015212475 | A1 * | 1/2017 | ......... F02M 21/0278 |
| DE | 102015225177 | | 6/2017 | |
| DE | 102015226491 | | 6/2017 | |
| EP | 2383457 | | 11/2011 | |
| FR | 2569240 | A1 * | 2/1986 | ............. F02M 51/08 |
| JP | H04137261 | U | 12/1992 | |
| WO | WO-0075503 | A1 * | 12/2000 | ......... F02M 51/0671 |
| WO | WO-2015144341 | A1 * | 10/2015 | ........... F16K 25/005 |
| WO | 2018028917 | A1 | 2/2018 | |

OTHER PUBLICATIONS

International Search Report for Application No. PCT/EP2018/070704 dated Oct. 9, 2018 (English Translation, 2 pages).

* cited by examiner

METHOD FOR PRODUCING A METERING VALVE, AND METERING VALVE

BACKGROUND OF THE INVENTION

The invention relates to a method for producing a metering valve for a fluid, in particular for a liquid and/or gaseous fuel. Moreover, the invention relates to a metering valve for a fluid, in particular for a liquid and/or gaseous fuel.

A preferred field of use of the proposed metering valve is the fuel supply of an internal combustion engine, it being possible for it to be, in particular, a gas engine or a gas/diesel engine of a vehicle, for example of a passenger motor vehicle, a commercial vehicle, a rail vehicle or a ship. In addition to mobile applications, the use of the metering valve in stationary systems for energy recovery or energy generation is also conceivable.

The metering valve can be, in particular, a CV gas valve, a "Large Engine Gas Valve" (LEGV), a "Multiport Injection Valve" (MPI) or a "Ported Fuel Injection" (PFI) valve.

By way of example, a gas valve for injecting a gaseous fuel into an intake section of an internal combustion engine is apparent from laid open specification DE 10 2015 212 475 A1, which gas valve comprises a sealing element which can be moved with a reciprocating movement with respect to a valve seat element. The sealing element configures a sealing face which can be brought into overlap with at least one throughflow opening which is configured in the valve seat element in order to close said throughflow opening. In order to provide a gas valve which is of particularly compact design and can be manufactured inexpensively, it is proposed in said document that the sealing element is of disk-shaped configuration and has at least one circular or arcuate recess which defines an outer ring section and an inner ring section. Here, the outer ring section and the inner ring section are connected via at least one web which is configured as a spring arm and permits a deformation of the sealing element. In this way, the sealing element can be clamped in via the outer ring section, in order to prestress the sealing element axially against the valve seat element. In order to open the gas valve, merely the inner ring section is lifted, the sealing element being deformed elastically. The elastic deformation brings it about that the sealing element closes automatically when the force (a magnetic force in the present case) for lifting the inner ring section ceases. That is to say, a closing spring for closing the gas valve can be dispensed with, as a result of which the construction of the valve is simplified and installation space is saved.

High requirements with regard to the metering accuracy are as a rule made of metering valves. This is the case, in particular, when the metering valve serves for the fuel supply of an internal combustion engine, since the metering accuracy has effects on the fuel consumption and the pollutant emissions.

In order to achieve a high metering accuracy, it has to be ensured that a defined opening cross section is released during opening of the metering valve. Since, in the case of a metering valve of the generic type, the opening cross section results from the length of a sealing edge which is configured on the sealing element times the stroke, a precise stroke setting is required, in particular.

SUMMARY OF THE INVENTION

The present invention is based on the object of specifying a method for producing a metering valve which has a high metering accuracy, in order to ensure the maintenance of a maximum permissible mass flow scatter. In particular, the method is to make a precise stroke setting possible.

The proposed method serves for the production of a metering valve for a fluid, in particular for a liquid and/or gaseous fuel, the metering valve comprising a preferably plate-shaped valve seat element with at least one throughflow opening for the liquid and/or gaseous fuel, a valve head which can be moved with a reciprocating movement and interacts in a sealing manner with the valve seat element for releasing and closing the at least one throughflow opening, and a stroke stop element with an annular stroke stop face for limiting the stroke of the valve head. During the production, in particular during the assembly, of the metering valve, the stroke stop element is prestressed axially in the direction of a stroke setting ring which surrounds the valve head. In this way, the stroke of the valve head is preset via the stroke setting ring. The axial prestressing force is changed for the precision setting of the stroke of the valve head, the stroke stop element being deformed.

The precision setting of the stroke contributes to the opening cross section which is released during opening of the metering valve being defined precisely. Accordingly, a metering valve which is produced in accordance with the specified method has a high metering accuracy. The metering valve is therefore suitable, in particular, for applications which require a high metering accuracy.

In the case of the method according to the invention, the precision setting of the stroke can be performed during and/or after the assembly of the metering valve, the postprocessing complexity being comparatively low. This is because merely the axial prestressing force which acts on the stroke stop element has to be changed. A complicated exchange of parts which is associated with dismantling, reassembly and the repeated testing of all functional values of the metering valve is as a rule not required. The proposed method therefore leads to shortening of the assembly and/or postprocessing time and, as a consequence, to a cost saving.

The deformation of the stroke stop element, which deformation is required for the precision setting of the stroke, is preferably in the micrometer range. That is to say, the precision setting of the stroke which is brought about in this way is subject to certain limits. Should they already be exhausted, an exchange of parts can possibly be required in order to maintain the maximum permissible mass flow scatter. In this case, the stroke stop element can be replaced. For example, a stroke stop element which has a lower stiffness and can therefore be deformed to a more pronounced extent can be used. As an alternative or in addition, the valve head and/or the stroke setting ring can be replaced.

The consequence of the deformation of the stroke stop element is that the spacing of the stroke stop element or of the annular stroke stop face which is configured on the stroke stop element decreases in relation to the valve seat element. This in turn leads to a restriction of the movement space of the valve head, with the result that the stroke which is preset via the stroke setting ring is decreased. The precision setting of the stroke which is brought about via this is as a rule sufficient to compensate for manufacturing and/or assembly tolerances. Furthermore, the manufacturing of the stroke setting ring and/or the valve head can be simplified, since said parts no longer have to be manufactured with high precision.

In the case of the method according to the invention, the stroke stop element is preferably prestressed axially in the direction of the stroke setting ring by means of the spring force of a spring. In order to perform the precision setting of the stroke of the valve head, merely the prestress of the spring accordingly has to be changed. As an alternative, the spring can be exchanged. The spring can be, for example, a cup spring or a compression coil spring. In the case of the selection of a suitable spring, the spring force of the spring is to be adapted to the stiffness of the stroke stop element.

As an alternative or in addition, the axial prestressing force can also be brought about via a body, the axial position of which can be changed in relation to the stroke stop element. To this end, the body can be screwed into a housing part of the metering valve, with the result that the axial prestressing force can be varied via the screw-in depth.

The axial prestressing force can be introduced directly or indirectly into the stroke stop element. The indirect introduction of force, for example via a force transmission element, has the advantage that a particularly homogeneous transmission of force can be achieved.

The axial prestressing force is preferably introduced in a region of the stroke stop element, which region is arranged radially on the inside in relation to an annular supporting face of the stroke stop element for support on the stroke setting ring. The greater the radial spacing between the region of the axial support and the region of the introduction of force, the more pronounced the deformation of the stroke stop element ("bending beam" operating principle). The introduction of force preferably takes place via an annular region which is arranged concentrically with respect to the annular supporting face of the stroke stop element, with the result that a homogeneous deformation is achieved.

Furthermore, in order to achieve the object mentioned at the outset, a metering valve for a fluid, in particular for a liquid and/or gaseous fuel, is proposed which comprises a preferably plate-shaped valve seat element with at least one throughflow opening for the liquid and/or gaseous fuel, a valve head which can be moved with a reciprocating movement and interacts in a sealing manner with the valve seat element for releasing and closing the at least one throughflow opening, and a stroke stop element with an annular stroke stop face for limiting the stroke of the valve head. According to the invention, the stroke stop element is prestressed axially in the direction of a stroke setting ring which surrounds the valve head, it being possible for the axial prestressing force to be changed, with the result that a precision setting of the stroke of the valve head can be brought about via a deformation of the stroke stop element.

Accordingly, the proposed metering valve can be, in particular, a valve which has been produced in accordance with the above-described method according to the invention.

Since the stroke stop element of a metering valve according to the invention is prestressed axially, the deformation of the stroke stop element can be influenced by way of a reinforcement or reduction of the axial prestressing force, in such a way that the stroke of the valve head is decreased or increased. An increase in the stroke presupposes that the stroke stop element is already deformed by way of the axial prestressing force which loads on it. Otherwise, only a decrease of the stroke can be brought about.

The construction of the metering valve according to the invention therefore permits a precision setting of the stroke of the valve head, with the result that it is ensured during opening of the valve that a defined opening cross section is released. Accordingly, the metering valve is distinguished by a high metering accuracy.

In accordance with one preferred embodiment of the invention, the stroke stop element is prestressed axially in the direction of the stroke setting ring by means of the spring force of a spring. The precision setting of the stroke of the valve head can therefore be performed in a simple way by way of a change of the spring prestress. The spring can be configured, for example, as a cup spring or a compression coil spring.

The spring can be supported axially on the stroke stop element directly or indirectly. The indirect support, for example via an electromagnet which is arranged between the spring and the stroke stop element for actuating the metering valve, has the advantage that the spring force is transmitted homogeneously. Furthermore, the spring which is as a rule already present for positionally fixing the electromagnet can be utilized for the axial prestress of the stroke stop element, with the result that a further spring can be dispensed with. Installation space can be saved in this way.

Furthermore, it is proposed that the stroke stop element has an annular supporting face for axial support on the stroke setting ring, and a region for introducing the axial prestressing force, which region is arranged so as to lie radially on the inside in relation to the annular supporting face. That is to say, a radial spacing is maintained between the region of the introduction of force and the axial support of the stroke stop element, which radial spacing leads to the desired deformation of the stroke stop element in accordance with the "bending beam" operating principle. The radial spacing is preferably identical circumferentially, with the result that a homogeneous deformation of the stroke stop element is achieved.

The stroke stop element is advantageously of disk-shaped or annular configuration. That is to say, the stroke stop element has a flat overall design. The flat overall design aids a deformation of the stroke stop element.

Furthermore, the stroke stop element preferably has a central recess. The central recess necessarily leads to an annular shape of the stroke stop element. The central recess is preferably adjoined by the annular stroke stop face which is therefore arranged so as to lie radially on the inside. The axial support of the stroke stop element on the stroke setting ring preferably takes place via an annular supporting face which is arranged so as to lie radially on the outside. In this way, the "bending beam" operating principle is implemented in an optimum manner.

In addition, the central recess of the stroke stop element makes the connection of the valve head to an armature possible. The armature can be acted on by means of an electromagnet, with the result that the stroke of the valve head can be brought about by means of magnetic force.

Furthermore, it is proposed that the valve head is prestressed axially in the direction of the valve seat element by way of the spring force of at least one spring. The spring can be configured, for example, as a compression coil spring which is arranged between the valve head and the stroke stop element. Via the at least one spring, the metering valve is held closed in the case of a non-energized electromagnet. Furthermore, the resetting of the valve head can be brought about by means of the spring.

BRIEF DESCRIPTION OF THE DRAWINGS

The method according to the invention and one preferred embodiment of a metering valve according to the invention will be described in greater detail in the following text on the basis of the appended drawings, in which.

DETAILED DESCRIPTION

Figure 1:
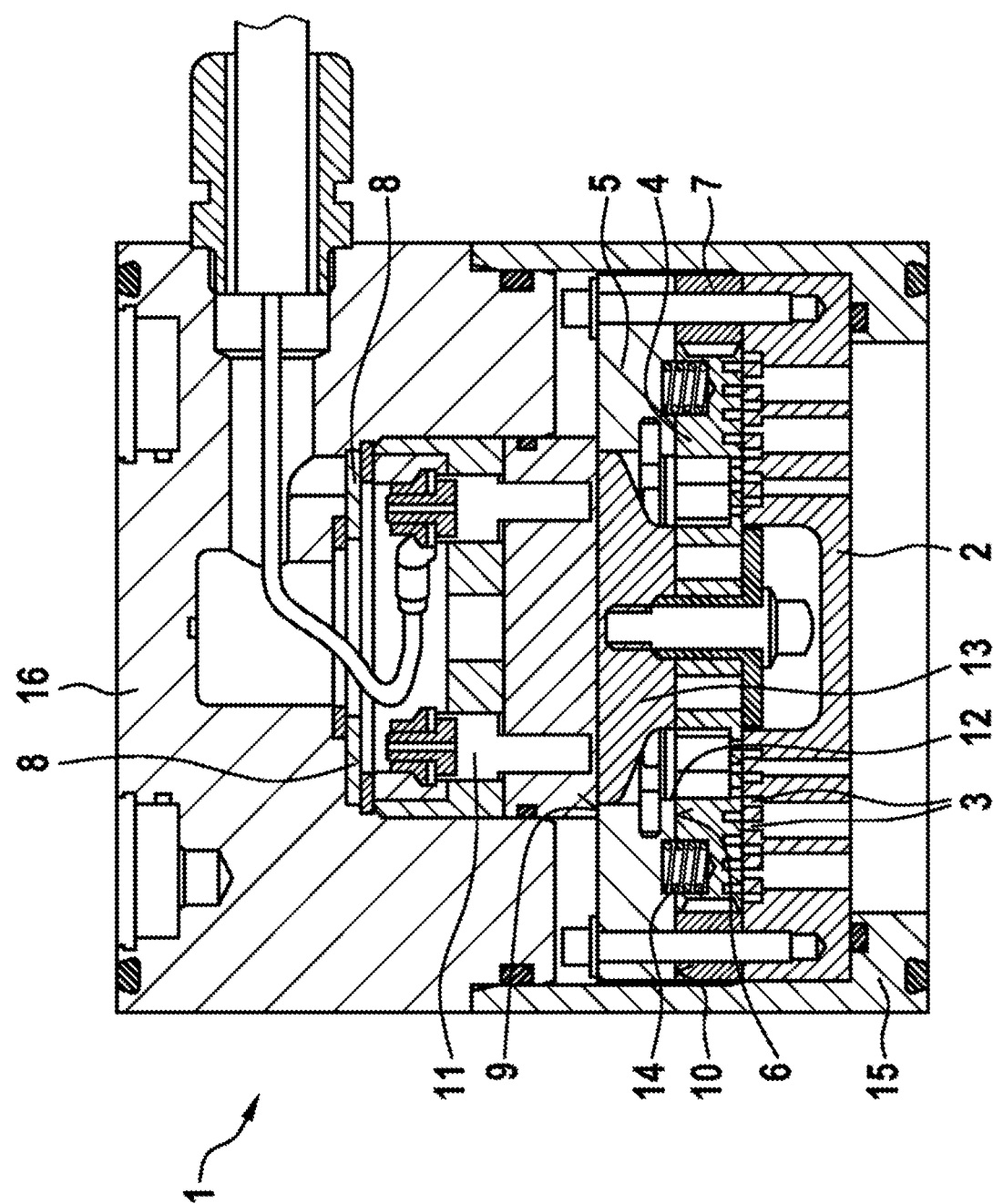
FIG. 1 shows a diagrammatic longitudinal section through a metering valve according to the invention.

FIG. 1 shows a metering valve 1 for metering a gaseous fuel into an intake section of an internal combustion engine. The metering valve 1 which is shown has been produced in accordance with a method according to the invention which makes a precision setting of the stroke of the metering valve 1 and therefore a precise setting of the effectively released area during opening of the metering valve possible.

The metering valve 1 which is shown comprises a hollow-cylindrical first housing part 15, in which a plate-shaped valve seat element 2 with a plurality of concentrically arranged arcuate throughflow openings 3 is arranged. A valve head 4 which can be moved with a reciprocating movement and is arranged above the valve seat element 2 is provided for releasing and closing the throughflow openings 3. The valve head 4 is connected to an armature 13, with the result that the stroke of the valve head 4 can be brought about by means of an electromagnet 11 which is received in a further housing part 16 which is connected to the first housing part 15.

Figure 2:
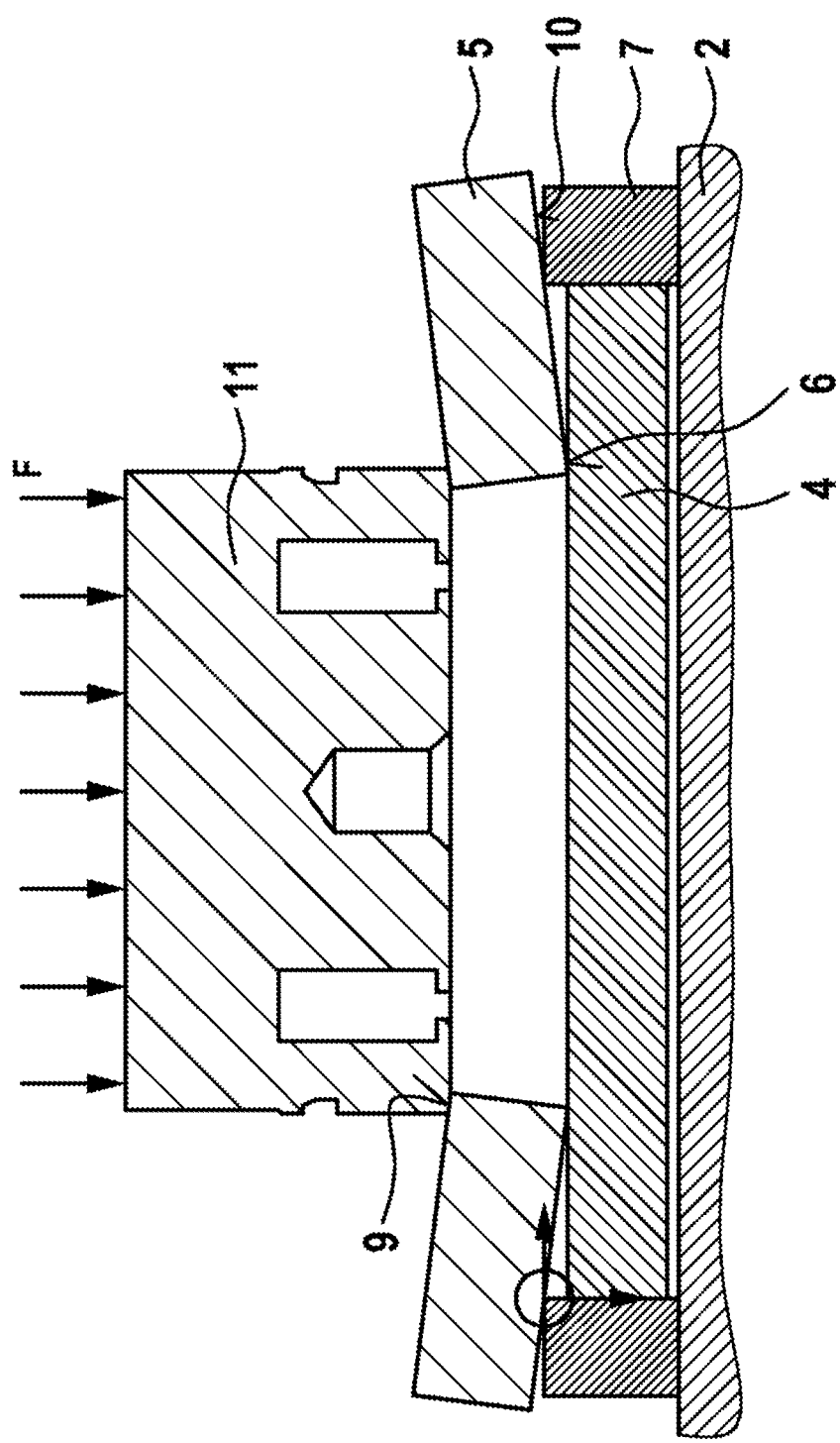
FIG. 2 shows a greatly simplified longitudinal section through the metering valve of FIG. 1 with a deformed stroke stop element for the precision setting of the stroke of the valve head.

An annular stroke stop element 5 with an annular stroke stop face 6 which faces the valve head 4 is provided for limiting the stroke of the valve head 4. Accordingly, the two end positions of the valve head 4 are determined on one side by way of the valve seat element 2 and on the other side by way of the stroke stop element 5, the spacing between the valve seat element 2 and the stroke stop element 5 corresponding to the stroke of the valve head 4. In the present case, the spacing is predefined by way of a stroke setting ring 7, against which the stroke stop element 5 is prestressed axially by means of the spring force of a spring 8. To this end, the spring 8 which is configured as a cup spring is supported on the electromagnet 11, with the result that the axial prestressing force is introduced indirectly via the electromagnet 11 into the stroke stop element 5. The introduction of force takes place in an annular region 9 which delimits a central recess 12 of the stroke stop element 5, in which central recess 12 the armature 13 is received. The stroke stop element 5 has an annular supporting face 10 for axial support on the stroke setting ring 7 and the annular region 9 is arranged so as to lie radially on the inside in relation to the annular supporting face 10. The axial prestressing force leads to a deformation of the stroke stop element 5, which deformation is shown in FIG. 2 in a greatly simplified or exaggerated manner. By way of the deformation, the annular stroke stop face 6 moves closer to the valve seat element 2, with the result that the spacing which defines the stroke between the stroke stop face 6 and the valve seat element 2 is decreased. Accordingly, a precision setting of the stroke of the valve head 4 can be performed by way of a change of the axial prestress of the stroke stop element 5. The axial prestressing force corresponds to the spring force of the spring 8 or the prestressing force of the spring 8, which force is denoted by "F" in FIG. 2 and acts on the stroke stop element 5 via the electromagnet 11.

When the electromagnet 11 is energized, a magnetic field is built up, the magnetic force of which pulls the armature 13 including the valve head 4 in the direction of the electromagnet 11, until the valve head 4 comes into contact with the annular stroke stop face 6 of the stroke stop element 5. In this position, the valve head 4 releases a defined opening cross section. When the energization of the electromagnet 11 is ended, the gas pressure forces and springs 14 in the form of compression coil springs which are arranged between the stroke stop element 5 and the valve head 4 reset the valve head 4 and the armature 13 into their starting position.

The invention claimed is:

1. A method for producing a metering valve (1) for a fluid, comprising a valve seat element (2) with at least one throughflow opening (3) for the fluid, a valve head (4) which can be moved with a reciprocating movement and interacts in a sealing manner with the valve seat element (2) for releasing and closing the at least one throughflow opening (3), and a stroke stop element (5) with an annular stroke stop face (6) which comes into contact with the valve head (4) for limiting a stroke of the valve head (4), the method comprising prestressing the stroke stop element (5) with an axial prestressing force in a direction of a stroke setting ring (7) which surrounds the valve head (4), and changing the axial prestressing force for precision setting of the stroke of the valve head (4), the stroke stop element (5) being deformed, wherein the stroke stop element (5) is prestressed axially in the direction of the stroke setting ring (7) by a spring force of a spring (8), wherein an electromagnet (11) for actuating the metering valve (1) is arranged between the spring (8) and the stroke stop element (5), and wherein the electromagnet (11) transmits the spring force of the spring (8) to the stroke stop element (5).

2. The method as claimed in claim 1, characterized in that the axial prestressing force is introduced in a region (9) of the stroke stop element (5), which region (9) is arranged radially on an inside in relation to an annular supporting face (10) of the stroke stop element (5) for support on the stroke setting ring (7).

3. A metering valve (1) for a fluid, comprising a valve seat element (2) with at least one throughflow opening (3) for the fluid, a valve head (4) which can be moved with a reciprocating movement and interacts in a sealing manner with the valve seat element (2) for releasing and closing the at least one throughflow opening (3), and a stroke stop element (5) with an annular stroke stop face (6) which is configured to come into contact with the valve head (4) for limiting the stroke of the valve head (4), characterized in that the stroke stop element (5) is prestressed, by a spring force of a spring (8), axially in the direction of a stroke setting ring (7) which surrounds the valve head (4), and the axial prestressing force can be changed, with the result that a precision setting of the stroke of the valve head (4) can be brought about via a deformation of the stroke stop element (5), wherein the spring (8) is supported axially on the stroke stop element (5) via an electromagnet (11) for actuating the metering valve (1), wherein the electromagnet (11) is arranged between the spring (8) and the stroke stop element (5) and is configured to transmit the spring force of the spring (8) to the stroke stop element (5).

4. The metering valve (1) as claimed in claim 3, characterized in that the stroke stop element (5) has an annular supporting face (10) for axial support on the stroke setting ring (7), and a region (9) for introducing the axial prestressing force, the region (9) being arranged so as to lie radially on the inside in relation to the annular supporting face (10).

5. The metering valve (1) as claimed in claim 3, characterized in that the stroke stop element (5) is of disk-shaped or annular configuration and/or has a central recess (12).

6. The metering valve (1) as claimed in claim 3, characterized in that the valve head (4) is prestressed axially in the direction of the valve seat element (2) by way of another spring force of another spring (14).

7. The method as claimed in claim 1, wherein valve seat element (2) is plate-shaped.

8. The method as claimed in claim 1, characterized in that the stroke stop element (5) is prestressed axially in the direction of the stroke setting ring (7) by the spring force of a cup spring or a compression coil spring.

9. The metering valve (1) as claimed in claim 3, wherein valve seat element (2) is plate-shaped.

10. The metering valve (1) as claimed in claim 3, characterized in that the stroke stop element (5) is prestressed axially in the direction of the stroke setting ring (7) by a spring force of a cup spring or a compression coil spring.

11. The metering valve (1) as claimed in claim 3, characterized in that the valve head (4) is prestressed axially in the direction of the valve seat element (2) by way of the spring force of at least one compression coil spring.

12. The metering valve (1) as claimed in claim 3, wherein the stroke setting ring (7) is positioned between the valve seat element (2) and the stroke stop element (5), wherein the stroke stop element (5) has an annular supporting face (10) which is radially outward from the annular stroke stop face (6) and which is supported on the stroke setting ring (7), wherein the stroke of the valve head (4) is defined by a first end position in which the valve head (4) contacts the valve seat element (2) and a second end position in which the valve head (4) contacts the annular stroke stop face (6), wherein the stroke stop element (5) is prestressed by an axial prestressing force introduced in a region (9) of the stroke stop element (5), which region (9) is arranged radially inward in relation to the annular supporting face (10) of the stroke stop element (5), wherein the deformation of the stroke stop element (5) is such that the annular stroke stop face (6) moves relative to the valve seat element (2).

13. The metering valve (1) as claimed in claim 12, wherein the deformation of the stroke stop element (5) moves the annular stroke stop face (6) closer to the valve seat element (2).

14. The metering valve (1) as claimed in claim 12, further comprising a housing, an armature (13) connected to the valve head (4), wherein the electromagnet (11) is configured to act on the armature (13) to cause the stroke of the valve head, wherein one end of the electromagnet (11) bears against the region (9) of the stroke stop element (5), and wherein the spring (8) is arranged between the housing and an opposite end of the electromagnet (11), such that the prestressing force is applied to the stroke stop element (5) via the electromagnet (11).

15. The method as claimed in claim 1, wherein the stroke setting ring (7) is positioned between the valve seat element (2) and the stroke stop element (5), wherein the stroke stop element (5) has an annular supporting face (10) which is radially outward from the annular stroke stop face (6) and which is supported on the stroke setting ring (7), wherein the stroke of the valve head (4) is defined by a first end position in which the valve head (4) contacts the valve seat element (2) and a second end position in which the valve head (4) contacts the annular stroke stop face (6), wherein the stroke stop element (5) is prestressed by an axial prestressing force introduced in a region (9) of the stroke stop element (5), which region (9) is arranged radially inward in relation to the annular supporting face (10) of the stroke stop element (5), wherein the deformation of the stroke stop element (5) is such that the annular stroke stop face (6) moves relative to the valve seat element (2).

16. The method as claimed in claim 15, wherein the deformation of the stroke stop element (5) moves the annular stroke stop face (6) further from the valve seat element (2).

17. The method as claimed in claim 15, wherein the metering valve (1) includes a housing, an armature (13) connected to the valve head (4), wherein the electromagnet (11) is configured to act on the armature (13) to cause the stroke of the valve head, wherein one end of the electromagnet (11) bears against the region (9) of the stroke stop element (5), wherein the spring (8) is arranged between the housing and an opposite end of the electromagnet (11).

* * * * *